United States Patent [19]

Downing

[11] 4,272,799
[45] Jun. 9, 1981

[54] SURFACE FLOODLIGHT ASSEMBLY

[76] Inventor: James R. Downing, 10218 Donna Ave., Northridge, Calif. 91324

[21] Appl. No.: 7,073

[22] Filed: Jan. 29, 1979

[51] Int. Cl.³ .................... F21L 11/00; F21V 1/00; F21V 7/02
[52] U.S. Cl. .................... 362/145; 362/184; 362/238; 362/240; 362/241; 362/247
[58] Field of Search .................... 362/31, 33, 145, 147, 362/152, 184–185, 225, 227, 236–241, 244–245, 247, 268

[56] References Cited

U.S. PATENT DOCUMENTS

| | | | |
|---|---|---|---|
| 2,586,374 | 2/1952 | Pennow | 362/268 X |
| 3,022,416 | 2/1962 | Roberts | 362/245 |
| 3,030,497 | 4/1962 | Cheng | 362/184 |
| 3,210,531 | 10/1965 | Neely et al. | 362/237 |

FOREIGN PATENT DOCUMENTS

| | | | |
|---|---|---|---|
| 750095 | 5/1933 | France | 362/241 |
| 164033 | 9/1933 | Switzerland | 362/145 |
| 463918 | 4/1937 | United Kingdom | 362/145 |

*Primary Examiner*—John Gonzales
*Assistant Examiner*—Thomas H. Tarcza
*Attorney, Agent, or Firm*—David O'Reilly; Donald M. Cislo

[57] ABSTRACT

A surface floodlight assembly for use in a heliport lighting system which provides a wide-angle horizontal beam spread and a very narrow vertical beam spread. A pair of sealed beam high-intensity floodlights mounted in a case with their respective axes at a predetermined angle provide a wide horizontal angle of convergence while limiting the vertical angle. The case enclosing the floodlights has a cover including a perimeter marking light which has a lens providing a wide angle of divergence. Mounting tabs are provided on the case for securing it in place and positioning groups of the floodlight assemblies around a heliport pad such that maximum illumination is obtained over a substantial portion of the pad. To minimize glare, a shroud is incorporated into the case limiting the divergence of the floodlight beams to prevent glare. Each floodlight assembly is a complete self-contained unit including a power supply which provides varying selections of brilliance and it can be permanently mounted or be portable.

12 Claims, 5 Drawing Figures

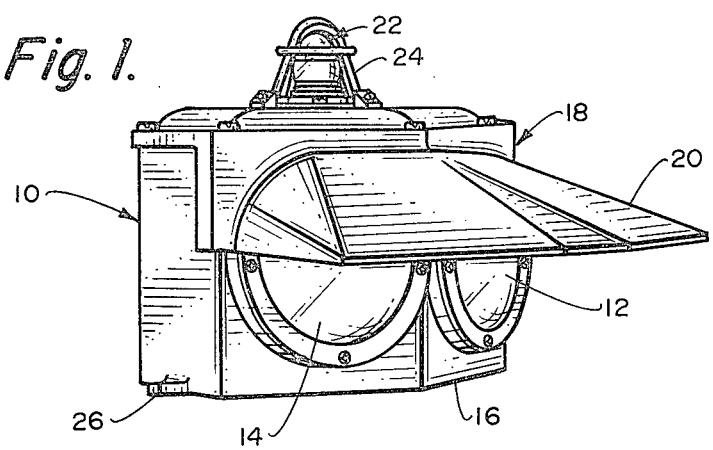
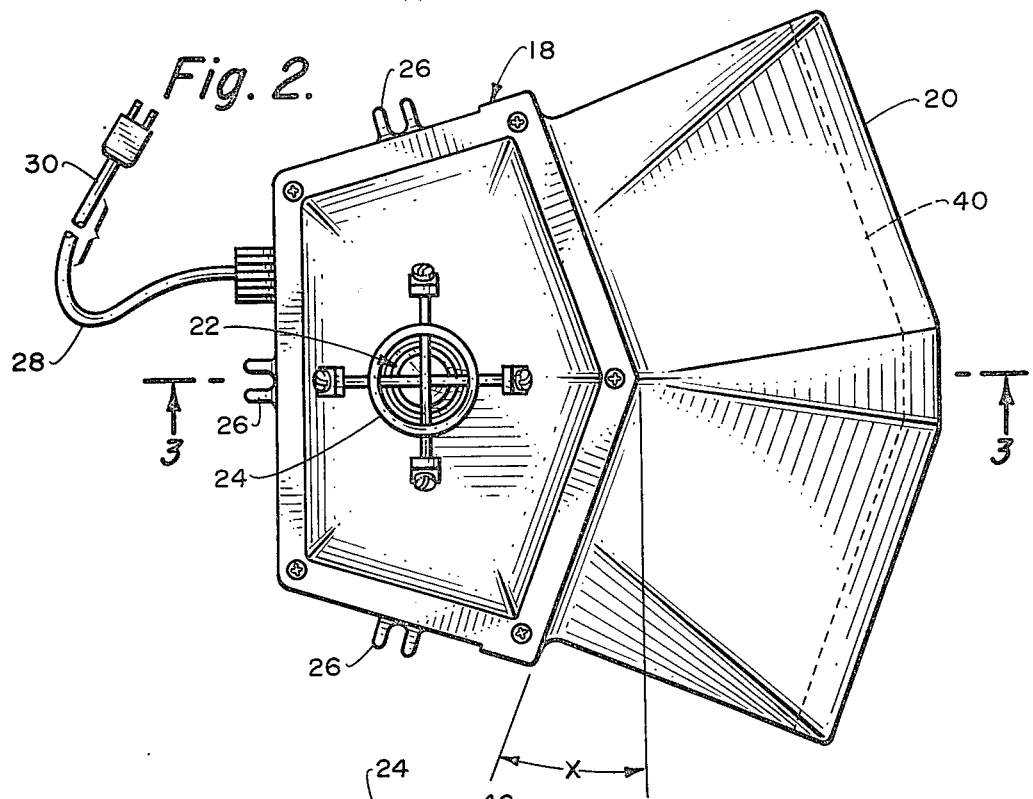
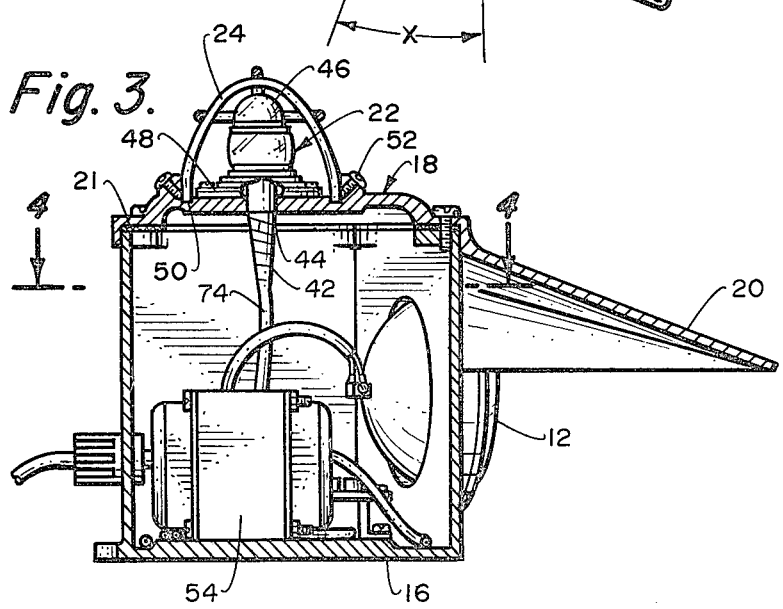

SURFACE FLOODLIGHT ASSEMBLY

BACKGROUND OF THE INVENTION

This invention relates to surface lighting systems, and more particularly relates to a floodlight assembly for surface lighting of heliport pads.

The lighting of landing strips, and in particular helicopter pads, presents unique problems in that adequate lighting must be provided without interfering with the pilot's ability to control the aircraft. This means that maximum lighting must be provided with minimum of glare and distraction to the pilot of an aircraft or a helicopter. In lighting airport runways, glare is not a particular problem because the lighting is usually at right angles to the approach of the aircraft. However, in lighting heliport pads, it is necessary to provide lighting for the entire perimeter so that the pilot can distinguish the size and location of the pad. In accomplishing this, it is important to avoid not only glare which can distract the pilot, but also minimize any possible obstructions. For this reason, no present lighting system has been able to accomplish adequate lighting while being a minimum hazard to pilots.

In some cases, to provide adequate lighting, floodlights have been provided on poles, with the floodlights pointing downward spotlighting the pad. The problem with this type of lighting is that the poles themselves present a hazard to the helicopter pilot because the spotlights necessarily must be elevated considerably from the pad. In many cases, in order to provide adequate lighting, they must be of extremely high intensity so that the poles may be positioned a considerably safe distance from the pad. It is also important in illuminating these pads that perimeter lighting be provided so that the pilot can clearly determine the size and shape of the pad. With the pole-type lighting, the intensity and positioning of the lighting makes perimeter lighting difficult, as the wide area of illumination can blot out the perimeter lighting. Further, in many cases heliport pads are provided on the roofs of high-rise buildings, excluding the possibility of utilizing any type of spotlighting on poles.

SUMMARY OF THE INVENTION

The purpose of the present invention is to provide a safe, hazard-free surface lighting floodlight assembly for heliport pads.

The present invention is comprised of floodlights having a wide horizontal beam spread and a very narrow vertical beam spread mounted in a case in groups with their axes positioned to provide a predetermined beam spread. Preferably, the floodlights are high-intensity sealed beams having horizontal beam spread of approximately 50° mounted with their axes at 40° to one another so that they provide a horizontal beam spread in the range of 85° to 95° with a vertical beam spread of 4° to 6°. In the preferred embodiment, these floodlights are mounted in pairs within a case, with the part of the case angled backwards from the center line 20° on each side producing a 40° angle between the respective floodlight axes.

The case includes a power supply which provides varying degrees of intensity or brilliance for the floodlights so that brilliance may be selected according to the size and shape of the heliport pads. The power supply is adaptable to 110 or 220 AC and provides a plurality of outputs to a matrix board for selecting the varying intensities. Each floodlight has plugs fitting sockets in the matrix board for selecting the varying intensities independently. Thus, each floodlight can have a different brilliance or both can have the same brilliance at preselected values. Preferably, each lamp is provided with a high, medium and low intensity which is generally sufficient to accommodate most heliport pad designs. At the low and medium intensities, lamp life is considerably extended, providing a unique advantage.

Access to the case is provided through a weatherproof cover bolted to the top. To reduce vertical glare even further, a shroud may be provided integral with the cover which extends outward and downward approximately 10° to 15° and preferably 12½° to limit the maximum vertical divergence of the light beam to less than 10°. The cover also includes a mounting ring for securing a perimeter marking lamp. The perimeter lamp is connected to the power supply and provides a light from a 360° omnidirectional airport yellow lens having a wide vertical angle of divergence. The lens is a combination of a plano-covex lens with a Fresnel lens providing a high vertical angle of divergence up to 20°.

The case for mounting the groups of floodlights has mounting tabs to secure the floodlight groups around the apron of the heliport pad. Since the floodlights and the perimeter lights are completely self-contained, including a power supply of varying intensity, the floodlight-perimeter light assembly can also be portable. The case has a flat bottom permitting it to rest on a flat base or on the ground for lighting a predetermined surface area. Thus, the system can be quickly and easily set up to provide illumination of a temporary heliport pad.

The case mounting the floodlights with the cover and perimeter light included is designed and constructed to provide a profile of approximately one foot, thus assuring a vertical profile of no more than a foot-and-a-half when mounted on an apron or a base. Thus, this floodlight-perimeter light assembly provides maximum lighting for heliport pads with minimum glare and minimum vertical obstruction, providing maximum safety for helicopter pilots. The perimeter light can be easily removed or the cover changed to convert the floodlight assembly for use in other surface lighting applications, such as parking lots.

It is one object of the present invention to provide a surface floodlight assembly having a predetermined horizontal beam spread and maximum vertical beam spread.

Another object of the present invention is to provide a surface floodlight assembly which presents a minimum vertical obstruction to landing aircraft.

Still another object of the present invention is to provide a surface floodlight assembly which includes a perimeter marking lamp.

Still another object of the present invention is to provide a surface lighting assembly including means for varying the intensity or brilliance.

Yet another object of the present invention is to provide a complete self-contained floodlight-perimeter light assembly for heliport pads.

Yet another object of the present invention is to provide a surface floodlighting assembly for incorporation into a heliport pad lighting system which provides maximum illumination over the entire pad.

Yet another object of the present invention is to provide a floodlight-perimeter light assembly which includes a shroud to minimize glare to landing aircraft.

Yet another object of the present invention is to provide a floodlight-perimeter light assembly which can be converted for use for illuminating any ground or surface area.

These and other objects of the present invention will become apparent from the following detailed description of the invention when considered in conjunction with accompanying drawings wherein like reference numbers identify like parts throughout.

BRIEF DESCRIPTION OF THE DRAWINGS

FIG. 1 is a perspective view of the self-contained floodlight-perimeter light assembly.

FIG. 2 is a top view of the floodlight-perimeter light assembly of FIG. 1.

FIG. 3 is a sectional view of the floodlight-perimeter light assembly taken at 3—3 of FIG. 2.

DETAILED DESCRIPTION OF THE PREFERRED EMBODIMENT

Figure 4:
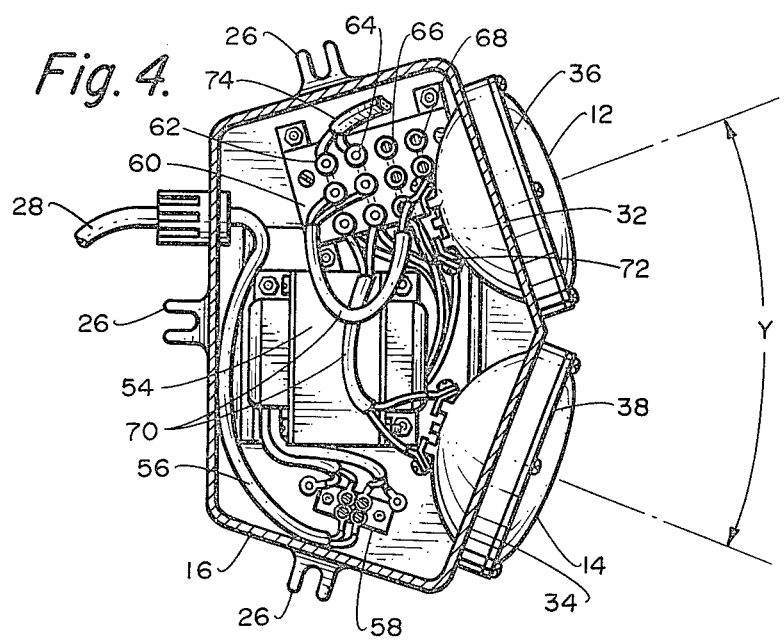
FIG. 4 is a sectional view of the floodlight-perimeter light assembly taken at 4—4 of FIG. 3.

The floodlight-perimeter light assembly described herein is principally for use in illuminating helicopter landing pads, but can be adapted for a wide range of uses in illuminating parking lots or runways. Referring to FIG. 1, there is shown a floodlight-perimeter light assembly 10 comprised of a pair of sealed beams 12 and 14 mounted in a case 16. The case is provided with a bolt on cover 18 which may or may not include a shroud 20. The cover 18 also includes steel lens guard 24. The case 16 includes mounting lugs 26 for securing the floodlight-perimeter light assembly to a base or surface. A gasket 21 beneath the cover 18 provides a seal to weatherproof the case.

The floodlight-perimeter light assembly includes a power cord 28 (FIG. 2) which may or may not include a plug 30. In some cases the floodlight-perimeter light assembly may be directly wired into a system for permanent installation or may have a plug 30 for connecting to a power source by extension cords. This permits the self-contained floodlight-perimeter light assembly to be portable for illuminating temporary helicopter landing areas. Thus, for emergency night operations, the system may be set up and quickly connected to a power source. As was mentioned previously, the floodlight can be adapted or mounted for use in illuminating any surface area such as a parking lot or runway, but is particularly suitable for illuminating heliport pads. This is because such pads present particular problems in that maximum illumination of the pad is desirable with minimum glare and obstruction because of the vertical landing and take off capability of helicopters.

The housing 16 is a cast metal box providing a pair of faces 32, 34 angled backward from a plane perpendicular to the center of the box approximately 20° as indicated at X. The mounting faces at 32 and 34 support the lamps 12 and 14, so that the angle Y between their axes is approximately 40°. The sealed beams 12 and 14 selected have a horizontal beam spread of approximately 50° providing coverage over a wide angle in the range of approximately 85° to 95°, providing an optimum coverage for placement of units around an area to be illuminated. The sealed beams 12 and 14 are secured by weather sealed clamping rings 36 and 38. These rings permit easy removal and replacement of the individual sealed beams. The floodlights 12 and 14 are high-intensity sealed beams which also provide a vertical beam width up to 6° above and below horizontal when mounted in the case to reduce glare.

In order to further reduce glare to landing helicopters, a shroud 20 may be provided and is angled downward approximately 12½° or in the range of 10° to 15°. The shroud 20 limits the vertical angle of divergence of the high-intensity sealed beams 12 and 14 to substantially less than 10° thus preventing any hazards from glare to the pilot of a landing helicopter. The amount the shroud or shade 18 reduces the vertical angle of divergence may be varied by cutting back the shroud or shade 18, for example, as indicated by the dotted line 40. Thus, depending upon the size and shape of a helicopter pad, the shroud can be reduced in length an amount to increase the illumination while maintaining the glare at a minimum.

The lid or cover 18 also provide means for mounting the perimeter light 22 and a lens guard 24. A lamp socket is provided with an omnidirectional airport yellow lens 46 secured over it by a weatherproof sealing ring 48. Lamp guard sockets 50 are provided on the cover 18 with screw lugs 52 for clamping the steel lamp guard 24 securely to protect the perimeter light 20. In cases when the surface area being illuminated does not need perimeter lighting the perimeter light 20 can be removed and a plate secured covering the aperture 44 by the ring 48. Additionally, alternate covers and lids 18 can be provided with or without the shroud 20 or the mounting system for the perimeter lamp 22.

Power is supplied to the floodlight and perimeter lamp through a step-down transformer 54 which may be adapted for 110 AC or 220 AC or other input and several outputs. The power cord 28 is connected to an interior cord 56 attached to a terminal strip 58. The terminal strip permits the primary or input side of transformer 54 connecting lugs to be connected for either 110 AC or 220 AC or other inputs. 54 is connected to a matrix selecting board 60 which provides varying brilliance to the floodlights 12 and 14, as well as to the perimeter light 22. The matrix board 60 has a row of ground sockets 62 and three rows for selecting brilliance of the lights. These rows of sockets 64, 66 and 68 permit high, medium and low intensity selections which are sufficient for most purposes. The floodlights are connected by cord 70 to plugs for insertion in the sockets of the rows in the matrix selection board 60 and are connected by lugs 72 to the floodlight. Cord 74 connects the perimeter light to the matrix board also.

Thus, with the matrix board 60, the lights can be independently varied in intensity depending upon the size and shape of the helicopter pad. Thus, if the pad is irregular in shape, one of the floodlights can be at high intensity with the other at medium or low or vice versa. Likewise, the floodlights can be at high intensity while the perimeter light could be of medium or low intensity, if desired. Another alternative would be to include a continuously variable rheostat. However, since most installations will be permanent, one particular preselected intensity will usually be sufficient, and the preselected intensity will not be changed. For helicopter landing pads of approximately 100 feet square, it is contemplated that the high intensity selection would be provided with medium and low intensity selections being suitable for helicopter landing pads or areas of 50 to 60 feet. The advantage of the lower intensities is that the life of the sealed beam lamps can be greatly extended at the lower intensities.

The entire construction is completely sealed and self-contained for weatherproof protection and minimum maintenance requirements. For maintenance, the sealed beam floodlights may be easily removed and replaced as can any of the elements of these lights or internal components. The lid or cover can easily be removed providing complete access for maintenance, replacement or repair of the internal components. The entire assembly is approximately one foot in height, permitting mounting on a base or pedestal with a maximum vertical obstruction of less than a foot-and-a-half. Thus, these floodlight-perimeter light assemblies provide a maximum illumination with a minimum hazard to pilots.

Figure 5:
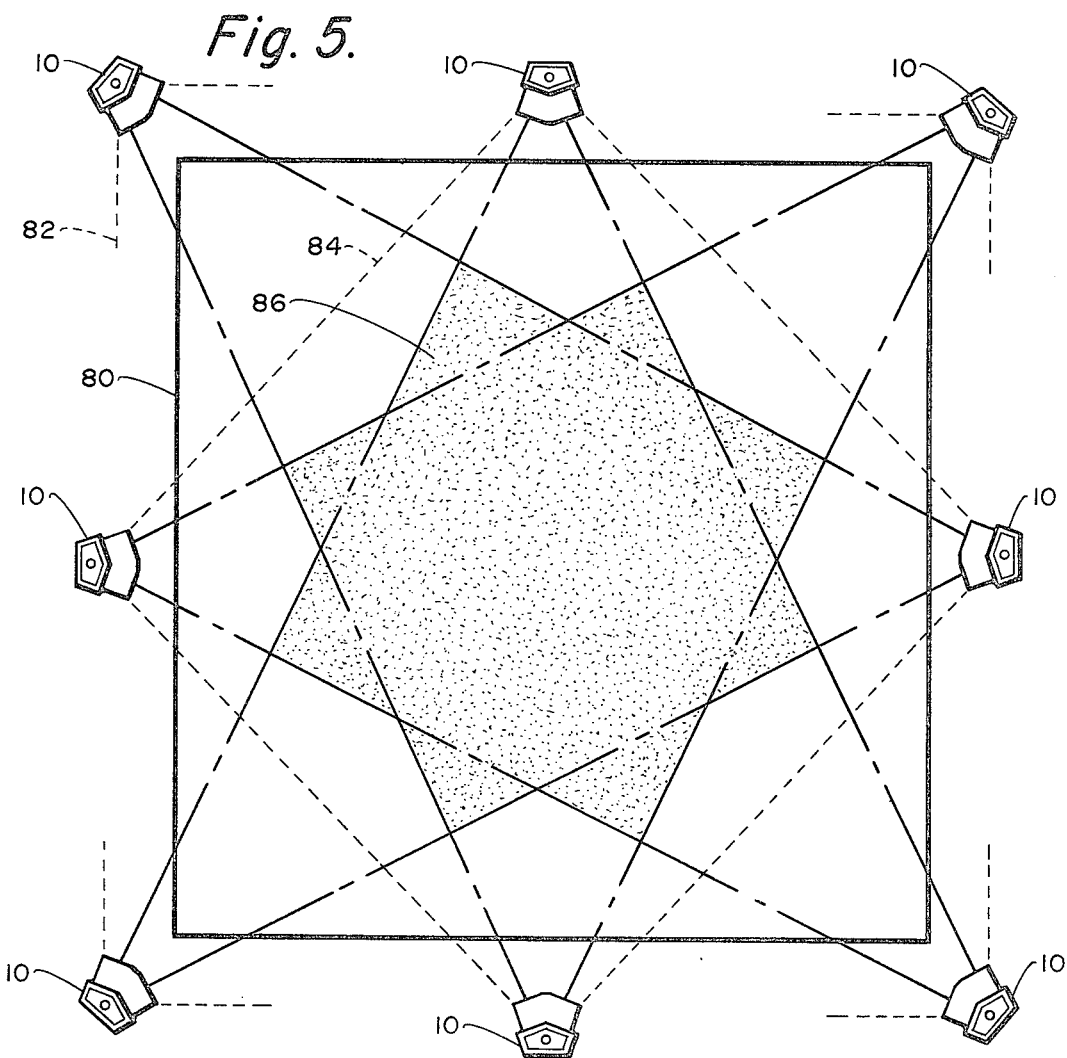
FIG. 5 is a diagrammatical illustration of the floodlight-perimeter light assembly arranged for illuminating a square surface area.

The installation of the floodlight assemblies for illuminating a square helicopter pad is illustrated in the diagram of FIG. 5. In this diagram, the pad is illustrated by the solid line 80 with the floodlight-perimeter light assemblies 10 being placed around at equal intervals as shown. For most helicopter pads, eight equally spaced floodlight-perimeter light assemblies will be sufficient. In some cases, for smaller pads, one floodlight-perimeter light assembly at each corner will provide adequate surface lighting. While the diagram only shows the floodlight-perimeter light assembly of the present invention, obviously various types of other lights may be utilized in conjunction with these. For example, glide slope indicating lights and strobe locating beacons, as well as separate perimeter lights and landing directional floodlights may be utilized to indicate the best landing approach direction. Also, remote control radio control unit may be provided to minimize power consumption only when landing operations are being performed.

The floodlight-perimeter light assemblies 10 have the axes of the corner lights in each pair pointing directly toward the axes of one of the lights at the midpoint of each side so that the lights overlap as shown. The dotted lines indicated at 82 and 84 illustrate the respective area of illumination of each floodlight-perimeter light assembly. The stippled area in the center shows the area of maximum light intensity illustrating the clear illumination of a substantial portion of the pad. If the helicopter pad 80 is rectangular in shape or one way is longer, added floodlights may be needed to form uniform lighting from all directions. Of course, the light intensity is adjustable for each particular floodlight of each self-contained unit to tailor the surface light intensity to the particular size and shape of each helicopter pad. On circular or round helicopter pads, in most case, four equally spaced floodlight-perimeter light assemblies will be sufficient to illuminate a pad of approximately 90 feet in diameter. Additional separate perimeter lights may be desirable. The particular lighting system described merely provides, by way of illustration, guide lines for heliport lighting which simultaneously outline the perimeter. However, light arrangements for various types, sizes and shapes of heliports will depend upon good judgment and different requirements that exist at one heliport compared to another. The floodlight-perimeter light assembly and system shown and described will, with proper placement, provide surface illumination combined with perimeter marking lights to clearly illuminate a large landing area while also marking the perimeter.

Obviously, many modifications and variations of the invention are possible in light of the above teachings. It is therefore to be understood that the full scope of the invention is not limited to the details disclosed herein and may be practiced otherwise than as specifically described.

What is claimed is:

1. A surface lighting assembly for non-glare illumination of helicopter landing pads comprising;
   a housing;
   mounting means for mounting said housing around the peripheral surface of said landing pad;
   cover means for covering said housing;
   omnidirectional light means on said housing for providing a perimeter marking light;
   a pair of adjacent faces in said housing angled backward with respect to one another;
   a pair of floodlights mounted in said adjacent faces; the angle of said adjacent faces being such that the respective axes of said floodlights are at approximately 40° to one another;
   said pair of floodlights selected to cooperate to produce a beam of maximum illumination over a horizontal beam width of approximately 90°; and
   limiting means for limiting the maximum vertical divergence of light to approximately less than about 10° whereby maximum illumination is provided over the surface area of a helicopter pad with a minimum direct glare to the helicopter pilot.

2. The lighting assembly according to claim 1 in which said limiting means includes a shroud on said cover means extending outward from said housing above said pair of floodlights to shade said floodlights and minimize glare from the vertical beam.

3. The surface lighting assembly according to claim 2 wherein said shroud is formed integral with said cover.

4. The surface lighting assembly according to claim 1 wherein said floodlights have a horizontal beam spread of approximately 50° and a vertical beam spread in the range of 4° to 6°.

5. The surface lighting assembly according to claim 1 wherein said omnidirectional lamp means comprises:
   a lamp mounted on said cover; and
   an omnidirectional lens surrounding said lamp.

6. The surface lighting assembly according to claim 5 wherein said lens is comprised of a plano-convex lens portion and a Fresnel lens portion and has a predetermind wide angle of divergence.

7. The surface lighting assembly according to claim 6 wherein said wide angle of divergence is up to approximately 20°.

8. The surface lighting assembly according to claim 1 including:
   electrical power control means for energizing said light assembly, said power control means including means for varying the brilliance of said lights.

9. The surface lighting assembly according to claim 8 wherein said means for varying the brilliance comprises:
   a step-down transformer having a plurality of outputs;
   a matrix board connected to said transformer outputs; and
   plug means for plugging the lights into the matrix board to select the degree of brilliance desired.

10. The surface lighting assembly according to claim 9 wherein said plug means includes separate plugs on each light whereby the intensity of each light may be separately varied.

11. The surface lighting assembly according to claim 9 wherein said matrix board provides three degrees of brilliance for each light, namely, a high, medium and low setting.

12. The surface lighting assembly according to claim 8 wherein said means for varying the brilliance of said lights includes means for separately varying the brilliance of each light.

* * * * *